United States Patent
Westra et al.

(10) Patent No.: US 11,062,540 B2
(45) Date of Patent: Jul. 13, 2021

(54) PHONE AS A KEY LOW LATENCY VEHICLE ACCESS

(71) Applicant: Ford Global Technologies, LLC, Dearborn, MI (US)

(72) Inventors: Mike Raymond Westra, Plymouth, MI (US); Lisa Therese Boran, Northville, MI (US); Daniel Aaron Zajac, Carleton, MI (US); Aldi Caushi, Northville, MI (US); Jochen Schubert, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/694,820

(22) Filed: Nov. 25, 2019

(65) Prior Publication Data
US 2021/0158639 A1    May 27, 2021

(51) Int. Cl.
*H04L 9/30* (2006.01)
*G07C 9/00* (2020.01)
(Continued)

(52) U.S. Cl.
CPC ....... *G07C 9/00309* (2013.01); *G06F 1/3206* (2013.01); *G06F 1/3296* (2013.01);
(Continued)

(58) Field of Classification Search
CPC ... G07C 9/00309; G07C 9/00007; H04L 9/30; H04L 63/0853; H04W 4/029; H04W 12/06; B60R 25/245; B60R 25/10
(Continued)

(56) References Cited

U.S. PATENT DOCUMENTS 8,344,850 B2    1/2013   Girard et al.
9,292,984 B2 *  3/2016   Kitahara ............... H04W 24/08
(Continued)

FOREIGN PATENT DOCUMENTS

WO    2018127407 A1    7/2018

OTHER PUBLICATIONS

"Building Digital Key Solution for Automotive," CarConnectivity Consortium (8 pages).

*Primary Examiner* — Vernal U Brown
(74) *Attorney, Agent, or Firm* — Frank Lollo; Eversheds Sutherland (US) LLP

(57) ABSTRACT

A Phone-as-a-Key (PaaK) system includes a pre-processor, a secure processor disposed in communication with the pre-processor, a cache memory associated with the pre-processor and the secure processor, and a memory for storing executable instructions. The pre-processor and the secured processor are configured to perform steps that can mitigate delay caused by mobile device authentication. For example, the pre-processor authenticates an authentication message associated with a mobile device used as a key for the vehicle, and stores the message in the cache memory. The pre-processor receives a door latch actuation signal, and initializes the secure processor in response. The pre-processor then provides access to the vehicle based on the secure processor initialization instruction, and the authentication message stored in the cache memory. After initialization, the secure processor sends a challenge value for second authorization of the mobile device, and triggers remedial actions if the device fails to respond correctly.

17 Claims, 4 Drawing Sheets

(51) Int. Cl.
   *H04L 9/32*        (2006.01)
   *G06F 12/0891*    (2016.01)
   *G06F 1/3296*     (2019.01)
   *H04W 4/029*      (2018.01)
   *H04W 4/80*       (2018.01)
   *G06F 1/3206*     (2019.01)

(52) U.S. Cl.
   CPC ............ *G06F 12/0891* (2013.01); *H04L 9/30* (2013.01); *H04L 9/3234* (2013.01); *H04W 4/029* (2018.02); *H04W 4/80* (2018.02); *G07C 2009/00412* (2013.01)

(58) Field of Classification Search
   USPC .......................................................... 340/5.72
   See application file for complete search history.

(56) References Cited

U.S. PATENT DOCUMENTS

| | | |
|---|---|---|
| 9,351,102 B2 | 5/2016 | Tucker et al. |
| 9,988,016 B1 | 6/2018 | Bianchi, III et al. |
| 10,244,476 B2 | 3/2019 | Elangovan et al. |
| 10,569,666 B1 * | 2/2020 | Lee .......................... B60L 53/68 |
| 2019/0159026 A1 * | 5/2019 | Rezaei .................. H04W 12/08 |

* cited by examiner

PHONE AS A KEY LOW LATENCY VEHICLE ACCESS

TECHNICAL FIELD

The present disclosure relates to passive vehicle entry systems, and more particularly, to a system for wireless passive entry passive start that provides vehicle access using a mobile device.

BACKGROUND

A phone-as-a-key (PaaK) system employs personal area networks (using protocols such as Bluetooth® Low Energy (BLE), for example) to detect and localize mobile phones without requiring specialized antenna and controllers for wireless communication. To maximize usability and minimize energy usage, vehicles enabled with a PaaK system may cycle from a low power mode after being parked for an extended period of time, to a higher power mode when a user actuates a door handle or performs another action to "wake up" the vehicle.

U.S. Pat. No. 9,351,102, assigned to Apple, Inc., (hereafter "the '102 Publication") discloses a mobile device used to access a vehicle by transmitting an activation message including vehicle access credentials. The mobile device in the '102 Publication sends an authorization code to the vehicle, and the vehicle compares the code to a locally-stored code. While the method disclosed in '102 Publication uses credentials to activate higher energy modes in a parked vehicle, current methods do not disclose using pre-authentication messages, caching the messages, using a fresh set of messages after unlock the vehicle to confirm authenticity, and sounding an alarm or performing other remedial actions if such messages are not confirmed.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is directed to lowering latency in Phone-as-a-Key (PaaK) systems. The vehicle PaaK system determines and monitors a location for a PaaK-enabled mobile device relative to the vehicle location in order to broadcast a pre-authentication message to the mobile device. As the mobile device approaches a predetermined communication range relative to the vehicle position, the mobile device may transmit a preliminary response message to the PaaK-enabled vehicle. The vehicle PaaK system may cache the preliminary response message until a user associated with the authenticating device performs an unlock action such as actuating a vehicle door latch/unlatch mechanism by pulling a door handle, for example. The PaaK system may unlock the door using data already sent to the pre-processor to perform a first level authentication without the delay associated with full authentication steps. After actuation of the door latch, the PaaK system may perform post-authentication confirmation using a secure processor, by transmitting, to the requesting device, a validation message that includes a challenge value requiring a validation response from the requesting device, and authenticating responsive validation messages using the secure processor. Responsive messages that correctly answer the validation message may confirm authenticity of the requesting device, and no further mitigating action is taken. The PaaK system may perform one or more mitigating actions responsive to an incorrect or non-received validation response. The mitigating actions can include logging the event with a Diagnostic Trouble Code (DTC), offboarding the DTC for further analysis on a server, triggering an alarm, sending a notification to the vehicle's owner(s) of a potential security issue, preventing vehicle ignition, disabling shifting vehicle out of park, limiting vehicle drive speed, and other possible actions.

The present disclosure may reduce latency associated with unlocking a PaaK-enabled vehicle using a mobile device and increase vehicle security using post-unlock verification steps that confirm device authenticity of the PaaK-enabled mobile device. In this manner, the PaaK system and methods for its use, as described herein, can increase security while minimizing or eliminating any latency associated with the unlocking and authentication steps. It should be appreciated that the mechanisms disclosed herein may be applicable to additional passive entry devices that utilize similar wireless communications protocols. These devices may include Bluetooth key fobs and NFC access cards with additional wireless capabilities.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
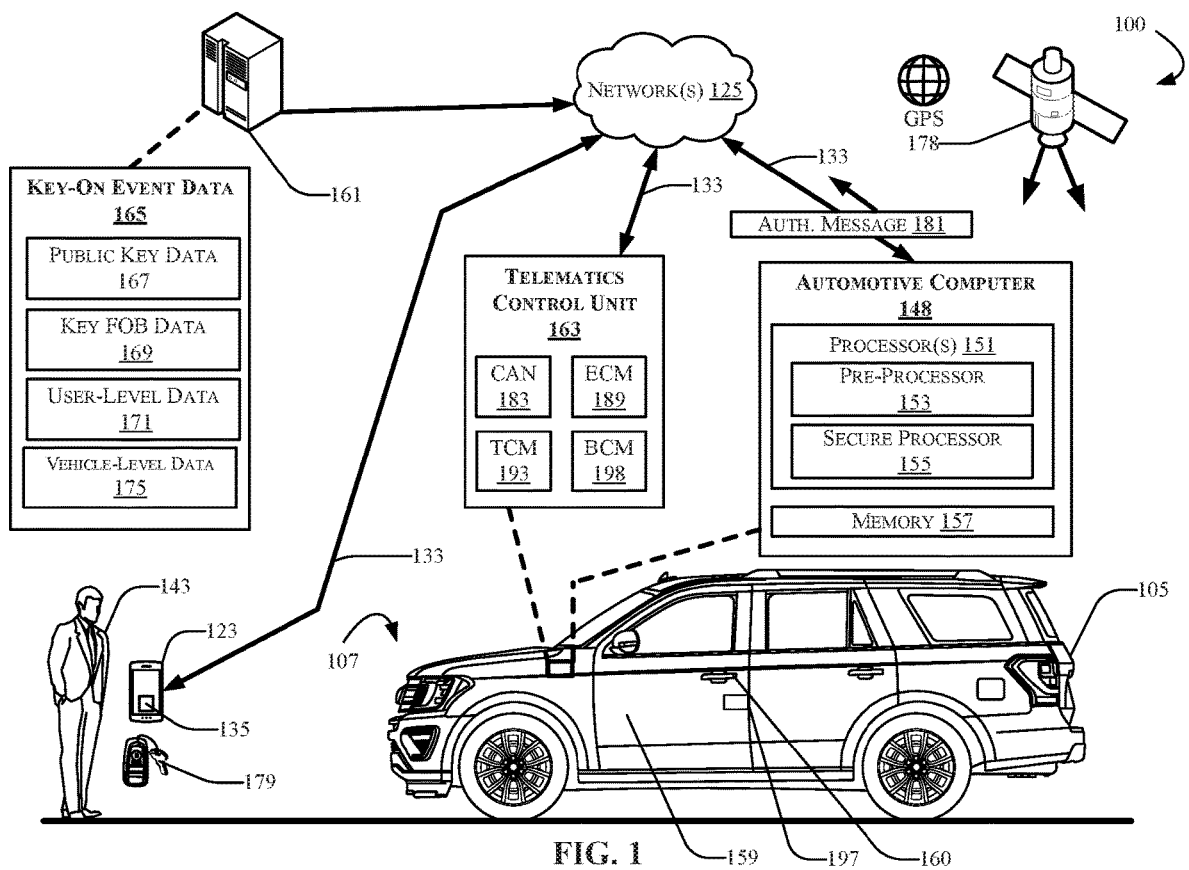
FIG. 1 depicts an example computing environment in which techniques and structures for providing the systems and methods disclosed herein may be implemented.

FIG. 1 depicts an example computing environment 100 that can include a vehicle 105 configured with and/or as part of a Phone-as-a-key—(PaaK) system 107, which may include and/or be disposed in communication with one or more server(s) 161, and a mobile device 123. The mobile device 123 can communicatively couple with the vehicle 105 and/or the server(s) 161 via one or more network(s) 125, which may transmit data using one or more wireless channel(s) 133. The mobile device 123 may include and/or be configured to execute the application 135. The application(s) 135 may perform information retrieval steps that provide information to the server(s) 161, which may be used to provide vehicle 105 access as described herein. The application(s) 135 may also authenticate vehicle users, such as a user 143 of the vehicle 105, by authenticating the mobile device 123 on which the application(s) 135 may operate.

The vehicle 105 can include an automotive computer 148, having processor(s) 151 and a memory 157. The vehicle 105 may further include a vehicle Telematics Control Unit (TCU) 163, which may be disposed in communication with and/or be a part of the automotive computer 148. The vehicle TCU 163 may, in some example embodiments, communicate information to and receive communications from the mobile device 123, and/or one or more server(s) 161, which may be associated with and/or include a Telematics Service Delivery Network (SDN) (not shown in FIG. 1). The vehicle 105 may also receive and/or be disposed in communication with a Global Positioning System (GPS) 178.

Although illustrated as a sport utility vehicle, the vehicle 105 may take the form of any passenger or commercial vehicle such as, for example, a car, a truck, a crossover vehicle, a van, a minivan, a taxi, a bus, a work vehicle, etc. Further, the vehicle 105 may be a manually-driven vehicle, and/or be configured to operate in a fully autonomous (e.g., driverless) mode and/or partially autonomous mode, and may include any powertrain such as, for example, a gasoline engine, one or more electrically-actuated motor(s), a hybrid system, etc.

According to an example embodiment, a user 143 may control one or more application(s) 135 operating on the mobile device 123, to communicate wake up message(s) to the vehicle TCU 163 and the automotive computer 148. The wakeup messages may transition the automotive computer 148 (and more precisely, the secure processor 155) from a low-energy state (sleeping or powered down) to a higher-energy state (e.g., booted up, and ready to process computer instructions from memory, perform authentication steps, etc.). Low-energy states and higher-energy states are generally referenced herein to describe operational states associated with the vehicle TCU 163 and the automotive computer 148. The energy states are associated with respective energy consumption rates, where power may be consumed from a stored power source onboard the vehicle, such as a vehicle battery or battery bank (not shown in FIG. 1).

It should be appreciated that the vehicle TCU systems may place the vehicle TCU 163 in a low-energy state to allow and/or limit vehicle functionality when the vehicle is parked. In one aspect, the low-energy state may limit wireless communication between the vehicle TCU 163 and other devices within communication range of the vehicle 105 (e.g., the mobile device 123), and prevent other types of wireless communication with the vehicle TCU 163 while in the low-energy state to conserve battery power while parked for extended periods of time. One example technology for TCU power state management is described in U.S. Pat. No. 9,462,545, assigned to Ford Global Technologies LLC (hereafter "the '545 Patent," which is incorporated herein by reference). The '545 Patent describes a system that places a vehicle TCU in a sleep mode, and activates a higher-power mode (e.g., a TCU extended power mode) to establish a data session with a telecommunication network. These non-limiting examples for low-power modes and higher power modes are submitted to provide examples only, and are not intended to be limiting with respect to functionalities that may be enabled, disabled, and/or otherwise changed by altering the TCU power state.

For example, the pre-processor 153 may, in a low-energy state, remain active (that is, receive continuous power) such that clock time information, date information, etc. is maintained, while keeping the secure processor 155 powered off or otherwise in a limited power mode. Accordingly, the pre-processor 153 may receive one or more BLE signals from the mobile device 123, and trigger a higher-energy state based on the proximity of the mobile device 123 to the vehicle 105. One example system for moving the PaaK system from a low-energy state to a higher-energy state is described in U.S. Pat. No. 10,244,476 B2, assigned to Ford Global Technologies LLC (which is incorporated herein by reference).

A Passive Entry Passive Start (PEPS) zone may be a zone defined by a radius having a predetermined distance from the vehicle 105. The pre-determined distance may be, for example, one meter, three meters, five meters, etc. In one example embodiment, the vehicle 105 sensors may determine that the mobile device 123 is within the PEPS zone and approaching the vehicle using a receiving antenna associated with the PaaK system. Using the antenna, the vehicle 105 may wirelessly connect with a low energy transponder (e.g., a BLE transponder) of a configured mobile device 123 The BLE signal(s) may include the power mode instructions from the mobile device that may be configured to change the power mode state for the vehicle TCU 163 and/or the automotive computer 148 from the low energy state to the higher energy state based (at least in part) on the authentication messages and verification of those received messages by the secure processor 155.

In some aspects, the mobile device 123 may establish, between the mobile device 123 and the vehicle TCU 163, one or more wireless channel(s) 133, and communicate with the vehicle 105 via the wireless channel(s) 133. The wireless channel(s) 133 may be encrypted or unencrypted. The mobile device 123 may communicate with the vehicle TCU 163 using a wireless transceiver (not shown in FIG. 1) integrated with and/or disposed as part of the mobile device 123. The wireless transceiver may communicate with the mobile device 123 through a wireless communication network such as, for example, the one or more network(s) 125.

The one or more network(s) 125 illustrate one example of a communication infrastructure in which the connected device(s) depicted in the computing environment 100 may communicate. The one or more network(s) 125 may be the Internet, a private or public network or another configuration. The network(s) 125 may use and/or include known communication protocols such as, for example, Transmission Control Protocol/Internet Protocol (TCP/IP), Bluetooth®, Bluetooth® Low Energy (BLE), Wi-Fi, Ultra Wide Band (UWB) and/or one or more cellular technologies such as, for example, Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The network(s) 125 may further include and/or embody a Vehicle-to-Vehicle (V2V) network such as, for example, a dedicated short-range communications (DSRC) network associated with an intelligent transportation system (ITS). In one aspect, the network(s) 125 may further include a Vehicle Ad-Hoc network (VANET) or a Mobile Ad Hoc network (MANET).

The vehicle TCU 163 can provide communication and control access to a plurality of vehicle computing modules such as, for example, a Controller Area Network (CAN) bus 183, one or more Engine Control Modules (ECMs) 189, a Transmission Control Module (TCM) 193, and/or a Body Control Module (BCM) 198. Control and/or communication with other control modules not shown is possible, and such control is contemplated. In some aspects, the vehicle Telematics Control Unit (TCU) 163 may control aspects of the vehicle 105 through the control modules 183, 189, and 193, and implement one or more instruction sets received from the application(s) 135 operating on the mobile device 123. In some aspects, the automotive computer 148 may control the TCU 163 to provide vehicle functionality responsive to determinations associated with authentication of the mobile device 123, and to perform actions such as sounding an alarm, transmitting a message, and other functions. In other aspects, the automotive computer 148 may also interface directly to one or more other vehicle modules (e.g., the BCM 198) without communicating with the TCU 163.

The automotive computer 148 may include the processor(s) 151, and may further include a computer-readable memory 157. The automotive computer 148 may be installed in an engine compartment of the vehicle 105 (or elsewhere in the vehicle 105) as part of a PaaK system 107 in accordance with the disclosure.

In other embodiments, the vehicle TCU 163 may be integrated with and/or be incorporated with the automotive computer 148. For the sake of simplicity, the computing system architecture of the automotive computer 148 may omit certain computing modules. It should be readily understood that the computing environment 100 depicted in FIG. 1 is one example of a possible implementation according to the present disclosure, and thus, it should not to be considered limiting or exclusive.

The one or more processor(s) 151 may be disposed in communication with one or more memory devices (e.g., the memory 157 and/or one or more external databases (not shown in FIG. 1). The one or more processor(s) 151 may utilize the memory 157 to store programs in code and/or to store data for performing aspects of the present disclosure such as authenticating messages received from the mobile device 123, which may be configured as part of the PaaK system 107, for generating secure processor initialization instructions in response to various sensor signals received from TCU-connected sensors, and for providing access to the vehicle 105. A key-on request may be an actuation of a door latch, touching a door handle or keyless entry keypad, presence detection through cameras or other electromagnetic sensing, or another similar action. Providing access can include, for example, unlocking a latch mechanism, opening a door, opening a door automatically upon detection of an authorized user, unlocking a locking mechanism, turning off an alarm sound, disabling the immobilizer and unlocking the electronic steering column lock, or performing another function associated with the vehicle 105 operation.

The memory 157 may be a non-transitory computer-readable memory. The processor(s) 151 may be configured to execute computer-executable instructions stored in the memory 157 for performing various functions of the PaaK system, as well as for performing vehicle control capabilities in accordance with the disclosure. Consequently, the memory 157 may be used for storing code and/or data code and/or data for performing operations in accordance with the disclosure. The memory 157 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 157 may be one example of a non-transitory computer-readable medium, and may be used to store programs in code and/or to store data for performing various operations in accordance with the disclosure. The instructions in the memory 157 can include one or more separate programs, each of which can include an ordered listing of computer-executable instructions for implementing logical functions. In another exemplary implementation, some or all components of the automotive computer 148 may be shared with the vehicle TCU 163.

The memory 157 may store various code modules such as, for example, a pre-processor communication controller (not shown in FIG. 1) for establishing the one or more wireless channel(s) 133 between the mobile device 123 and the vehicle 105. The memory 157 may also store a secure communication controller (not shown in FIG. 1) for performing other functions such as message generation associated with authenticating the mobile device 123 for use as a key (e.g., as part of the PaaK system 107) and providing physical and/or operational access to the vehicle 105, (e.g., by unlocking a vehicle door 159 and/or actuating one or more vehicle modules via the TCU 163).

The memory 157 may also store code modules for establishing communication between the vehicle TCU 163, the automotive computer 148, the server(s) 161, and the mobile device 123. In one example embodiment, the memory 157 may store instruction set(s) received from the one or more server(s) 161 and/or the mobile device 123, which may include an analytical model for predicting when the user 143 will approach the vehicle 105 to initiate a key-on event. In another embodiment, the memory 157 may store authenticating information associated with the vehicle 105, information associated with the user 143 and/or the mobile device 123, credentials used for authentication purposes such as, for example, public and/or private key(s), and/or information associated with the application 135 operative on the mobile device 123. The memory 157 may also store instructions associated with steps described hereafter with respect to FIGS. 2 and 3.

The server(s) 161 may be and/or include one or more cloud computing mainframe computing platform(s) configured to receive key-on event data 165 from the vehicle 105 and/or other vehicles in a vehicle fleet (the fleet vehicles not shown in FIG. 1). The key-on event data 165 may be a centralized storage service associated with data storage for the PaaK system 107, and can include information associated with user access to the vehicle 105. For example, the key-on event data 165 may include authentication information and encryption keys, such as public key data 167, which may store one or more public keys used to authenticate the mobile device 123, the key fob 179, or other devices not shown in FIG. 1. The key-on event data 165 may further include key FOB data 169, which may be used to store information used for authenticating and/or associating the key fob 179 with the user 143 and/or the mobile device 123. The key-on event data 165 may further include user-level data 171 that may be associated with the user 143, including identification information associated with the user 143, biometric information, password credentials, persistent user access tokens such as OAuth2 tokens, address information, and/or other user-specific information such as, for example, user schedule information, and vehicle use pattern information. The key-on event data 165 may further include vehicle level data 175, which may be used to store information.

Although described in this section with respect to the user 143 and the vehicle 105, it should be appreciated that the key-on event data 165 may include and/or be associated with use data from any number of users, vehicles, etc. For example, the server(s) 161 may also include and/or be disposed in communication with a Telematics SDN (not shown in FIG. 1), that communicates with TCUs associated with other vehicles in a vehicle fleet (not depicted in FIG. 1).

The vehicle 105, and more particularly the vehicle TCU 163, may transmit any portion of the key-on event data 165 to the server(s) 161 at predetermined intervals of time during the course of everyday vehicle usage. For example, the use data may be transmitted by the TCU and/or received by the server(s) 161 at periodic intervals (one hour, one day, one week, etc.). The use data can include date information and time information associated with times that the user 143 has historically approached the vehicle 105, unlocked the vehicle 105, operated the vehicle 105, etc. These events are referred to herein, collectively, as key-on event(s), and the date, time, and other information, are referred to herein as key-on event data 165. In other aspects, the vehicle TCU 163 may transmit the key-on event data 165 to the server(s) 161 responsive to receiving a request from the server(s) 161.

The key fob data 169 may include information associated with a key fob 179 that is paired with and configured to control operational aspects of the vehicle 105. For example, the key fob may be used to control vehicle locking, unlocking, arming/disarming, light control, starting, etc. Accordingly, the key fob data 169 may include a fob identifier (not shown in FIG. 1) that uniquely associates the key fob 179 with the user 143, the vehicle 105, the vehicle TCU 163, and/or the mobile device 123. In some aspects the fob usage data may further include frequency information, signal strength information, time information, date information, position data, VIN, supplier, number of vehicles the fob is paired with, the number of fobs paired with the vehicle, and/or other information that may be associated with determining patterns associated with the user 143 and the use of the vehicle 105, and that may be used to verify access through validation responses to authentication messages.

According to another embodiment, calendar information, and/or other schedule information having particular dates and times of activities may be accessed by the server(s) 161 to determine the user-level data 171 associated with the user 143. Accordingly, the user-level data 171 may include schedule information associated with the user 143 that may be specific to that individual. The user-level data 171 may include, for example, calendar information associated with a digital calendar (not shown in FIG. 1), and patterns associated with the user 143, where the patterns indicate that a key-on event 165 occurs on particular days of the week, at particular times of the day, on particular calendar days, etc. The user-level data 171 may further include information associated with the user 143 with which one or more challenge values may be specific to the user 143, known only by the user 143, and/or set by the user 143. For example, the secure processor 155 may maintain a working copy of the user-level data 171 in the memory 157 of the automotive computer 148, and use the user-level data 171 (or the copy thereof) to formulate challenge values sent from the automotive computer 148 to the mobile device 123.

The pre-processor 153 may receive an authentication message 181 from the mobile device 123, and store the authentication message 181 in the memory 157 for preliminary authentication purposes when the mobile device 123 later approaches the vehicle 105. By storing the authentication message 181 in the memory 157, the PaaK system 107 may reduce or eliminate any delay in providing secure access to the vehicle 105 (e.g., by unlocking the door at first touch without delaying the unlock instruction before the secure processor 155 can initialize, generate a new authentication message, wait for the mobile device 123 to respond, and process the resulting authentication message 181).

The pre-processor 153 may provide initial access to the vehicle 105 when the mobile device 123 is within the PEPS zone. Determining that the mobile device 123 is proximate to the vehicle 105 and within the PEPS zone, in conjunction with one or more other triggers, may cause pre-authorization steps to begin. For example, the pre-processor 153 may generate a secure processor initialization instruction responsive to a door latch opening, or a user touching the sensory area of a door handle or keyless entry keypad, or presence detection through cameras or other electromagnetic sensing. The pre-processor 153 may receive a sensor output that indicates an attempt to enter the vehicle.

The handle touch, by itself, would not trigger an unlock instruction. Rather, in an example embodiment, the touch to the door handle 160, plus the proximity indication associated with the position of the mobile device 123 with respect to the vehicle 105, may cause a door handle sensor (not shown in FIG. 1) to transmit sensor output to the pre-processor 153. The pre-processor 153 may receive the vehicle sensor output associated with the actuation of the door handle 160 (and more precisely, associated with an actuation of a door latch mechanism 197 of the door handle 160), and generate a secure processor initialization instruction to the secure processor 155 in response.

The pre-processor 153 may also provide access to the vehicle 105 in conjunction with the secure processor 155 by unlocking the door 159, based on the key-on request 165 and/or the authentication message 181 stored in the cache memory of the automotive computer 148. The secure processor initialization instruction may initialize the secure processor 155, by sending instructions that "wake up" the secure processor 155 by changing a power mode profile from a low-energy state to a higher-energy state. Once initialized, the secure processor 155 may verify the authentication message 181 stored in the cache memory of the automotive computer 148 before unlocking the door 159.

The initialization instruction may cause the secure processor 155 to change a power mode profile from a low power consumption mode to a higher power consumption mode based (at least in part) on an authentication message received from the mobile device, and/or based on actuation of the door handle 160. The pre-processor 153 may, responsive to these triggers, begin performing other authorization steps described hereafter in greater detail. For example, the secure processor initialization instruction may trigger the secure processor 155 to generate an authorization message that includes one or more challenge values to the mobile device 123 (and/or the application 135). The challenge values may be questions that have answers specific to the user information, such as conventional password recovery challenge values. In other aspects, the challenge values may be requests for encrypted key information associated with public/private key sets associated with an encrypted password or other data (which may require no user input, but rather generates responses automatically by the application(s) 135 on the mobile device 123).

The mobile device 123 may generate output based (at least in part) on the challenge value transmitted by the automotive computer 148. In one aspect, the user 143 (and more particularly, the mobile device 123) may receive an output message indicative of the challenge value, and select or enter an answer that only the user 143 and/or the user device 123 could know. Stated in another way, the challenge value may be an electronic request for response from the mobile device 123 that includes a private key stored thereupon, or it may be an electronic request for response from the mobile device 123 that includes user input responsive to a verification question. An example of the latter may be, for example, a selection of the user's undergraduate institution from a list having multiple selections. The purpose of the challenge-question and response may be to determine if preliminary vehicle access provided to the mobile device 123 is proper.

After the secure processor 155 has validated the user access with follow-up authentication steps, the PaaK system 107 can certify, within a reasonable or predetermined level of probability, that the requesting device (i.e., the mobile device 123) is authorized to access and enable operational capability of the vehicle 105, and is not merely spoofing or fraudulently requesting vehicle access. Aspects of the present disclosure, therefore, may mitigate and/or eliminate lag time associated with full authentication of the mobile device 123 by providing intermediate access at the same time as initialization of the secure processor 155, without introducing an unreasonable risk associated with invalid vehicle entry and operation.

Figure 2:
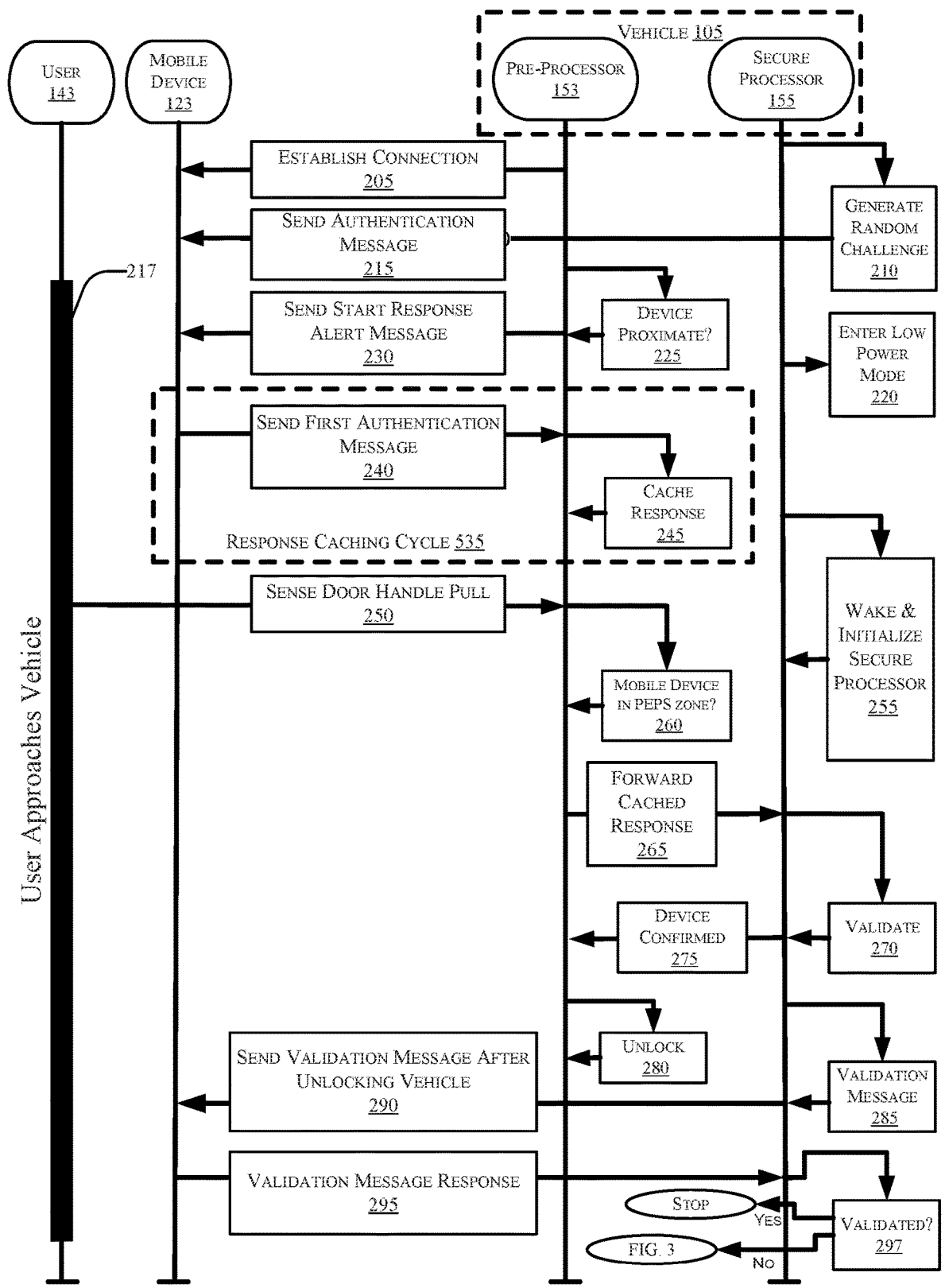
FIG. 2 illustrates an example embodiment of the present disclosure where an automotive computer is configured with a PaaK system to provide vehicle access using a pre-processor and a secure processor.

FIG. 2 illustrates an example embodiment of the present disclosure where the automotive computer 148 is configured with the PaaK system 107 (as shown in FIG. 1). According to the embodiment of FIG. 2, the automotive computer 148 may provide vehicle access to the mobile device 123 using the pre-processor 153 and the secure processor 155. The preliminary steps 205-215 may be performed when the mobile device 123 is within a range for low-energy communication (e.g., within the PEPS zone described above with respect to FIG. 1). For example, the preliminary steps 205-215 may occur when the vehicle 105 is in a higher-energy state, such as a vehicle 105 setup cycle, or during another operation that places the mobile device 123 within wireless communication of the vehicle 105 when the secure processor 155 is in a higher-power mode.

At step 205, the pre-processor 153 may transmit a wireless signal to a vehicle transceiver (e.g., a Bluetooth Low Energy (BLE) module associated with the vehicle 105), where the transceiver establishes a connection with the mobile device 123. The secure processor 155 may also generate a random challenge value at step 210. Generating the random challenge value may include, for example, generating a question that has a pre-determined answer. The question and answer pairs described as the random challenge value can be literal questions and answers that may be associated with the mobile device 123, the user 143, the vehicle 105, and other information that may be used to determine if the person answering the random challenge is the intended authorized user.

In another example embodiment, a random challenge value may be a challenge question used in two-factor authentication, and password retrieval operations (e.g., mother's maiden name, make and model of a first vehicle owned, etc.).

In other aspects, the random challenge value may include a private key and public key pair associated with the public key data 167 (as shown in FIG. 1), where the question is a request for the private key, and the answer is a message having the private key. The secure processor 155 may use the user-level data 171, the vehicle-level data 175, the public key data 167, or other information, to generate the random challenge message at step 210, which can include one or more challenge values described above.

At step 215, the secure processor 155, while in the higher-energy state (that is, not sleeping or in a low-energy state), may transmit the random challenge value to the mobile device 123 as part of the authentication message 181 (depicted in FIG. 1). The mobile device 123 may store the authentication message 181 in computer memory of the mobile device (not shown in FIG. 2). For example, after receiving the wake message at 215, the user may leave the vehicle parked for a duration of time sufficient for the vehicle 105 to enter into a low-energy state. For clarity, after receiving the wake message at step 215, the mobile device 123 may store the wake message, which will be referred to hereafter as an authentication message 181. The secure processor 155 may enter into a low-power mode at step 220 responsive to determining that the mobile device 123 and/or the user 143 is not within the PEPS zone for at least a predetermined threshold of time. For example, the user 143 may have parked the vehicle 105, and left the proximity of the vehicle 105 such that they were not in the PEPS zone for the predetermined threshold of time.

The user 143 may later (after the vehicle 105 has entered into the low-energy mode) return to the communication zone of the vehicle 105 concurrently with the mobile device 123. The user approach 217 is depicted in FIG. 2 as a rectangular bar signifying a proximity of the user 143 to the vehicle 105 after a duration of time has passed from the receipt of the authentication message 181 at step 215.

When the mobile device 123 is within the communication zone of the vehicle 105 (within the PEPS zone, for example) the pre-processor 153 may evaluate an approximate physical distance between the mobile device 123 and the vehicle 105. The pre-processor may determine the proximity of the mobile device 123 using a variety of known methods, including for example, measuring a strength of a BLE signal, evaluating GPS data returned from the mobile device 123, and/or via other methods.

Responsive to determining that the mobile device 123 is proximate to the vehicle 105 at step 225, the pre-processor 153 may transmit a start response alert message at step 230 using the low-energy transmitter (e.g., a BLE module or another near-field communication transmitter). The step 230 is configured to cause the mobile device 123 to transmit an authentication message in an iterative fashion (e.g., at a predetermined time interval, and/or for a predetermined number of times). For example, in a response caching cycle 535, the mobile device 123, in response to receiving the start response alert message at step 230, may begin the response caching cycle 535 by transmitting the authentication message at step 240. After receipt of the authentication message, the pre-processor 153 may cache the response at step 245 in a cache memory (not shown in FIG. 2) associated with the pre-processor 153. The pre-processor 153 may iteratively cache the responsive authentication message to ensure receipt of a usable authentication message from the mobile device 123. In other aspects, the power mode instruction that causes the secure processor 155 to enter into a higher-power mode may be sent by the pre-processor after receiving and/or caching a predetermined number of iterations of the response caching cycle 535. A predetermined number may be, in this case, for example, three times, two times, etc.

At step 255, in an example where the vehicle is in a higher-power state, after determining that the mobile device 123 is proximate to the vehicle 105 (at step 225), and contemporaneously, substantially contemporaneously, or following completion of the response caching cycle 535, the pre-processor 153 may transmit a power mode instruction (not shown in FIG. 2) to cause the secure processor 155 to wake and initialize.

In an example where the vehicle is in a low-power mode, only a door handle pull 250, or other direct vehicle action request may cause the secure processor to wake. For example, the power mode instruction may include one or more encoded instruction(s) configured to cause the vehicle TCU 163 to change a TCU state from a low energy state to a higher energy state in response to the door handle pull 250, and also may initialize the secure processor 155.

Although outside of the scope of the present disclosure, it is appreciated by those skilled in the art, that initialization of a processor may comprise several power cycling, memory clearing, and other steps that are omitted herein for simplicity. Accordingly, during the step 260, the secure processor 155, responsive to issuance of the power mode instruction, may wake and initialize at step 255 by entering into a higher-energy mode.

At step 250, the pre-processor 153 may sense a door handle pull. For example, a sensor associated with the door latch mechanism 197 (depicted in FIG. 1) and/or associated with the door handle 160 (also depicted in FIG. 1) may generate an output signal responsive to a touch or actuation by the user 143. Additional output signals may be related to detection of physical touch on vehicle surface through capacitive sensing, or presence detection through cameras or other electromagnetic sensing.

At step 260, the pre-processor 153 may determine, responsive to receiving the output signal associated with the door handle/door latch signal, whether the mobile device 123 is within the PEPS zone. Also, the step 255 may, in conjunction with a door handle actuation, provide an indication that the user performing the door opening operation is the authorized user 143 associated with the mobile device 123.

At step 265, the pre-processor 153 may forward the cached information associated with the first authorization (which was saved to cache memory of the automotive computer 148 at step 245) to the secure processor 155.

At step 270 the secure processor 155 may validate the cached first authorization response by comparing the first authorization response to information stored in a secured data store (e.g., a portion of the memory 157).

At step 275, responsive to determining that the mobile device 123 has been validated, the device is confirmed and approved by the secure processor 155 for unlocking.

At step 280, the vehicle sensor output associated with the actuation of the door latch mechanism 197 may, after being received by the pre-processor 153, in conjunction with the determination that the mobile device 123 is proximate to the vehicle 105 (at step 225), and further in conjunction with the validation step 270, cause the pre-processor 153 to generate an instruction that causes the door latch mechanism 197 to unlock. Accordingly, the pre-processor 153 may transmit one or more vehicle operation instructions to the vehicle TCU 163 that allow the vehicle 105 to start. It should be appreciated that, with respect to timing of the steps, the wake and initialization step 255 may be substantially similar to and/or contemporaneous with respect to the issuance of the unlocking instruction.

In addition to the initial validation at step 270, which may be based on various authentication factors in combination (e.g., the proximity of the mobile device 123, and receipt of the authentication message from step 215), it may be beneficial to increase the reliability of the authentication of the user 143 and the mobile device 123, even after providing vehicle access at step 280. Accordingly, the secure processor 155 may perform a second validation that can include transmitting, via the secure processor 155, a validation message at step 285. The validation message generated at step 285 and transmitted at step 290, may be configured to elicit a response 295 from the mobile device 123. The response transmission can include a validation message response having an answer associated with the random challenge value generated at step 210. The answer to the random challenge may be uniquely paired with a corresponding challenge value, where a plurality of challenge values may be generated by the secure processor 155, and saved in the memory 157, from which the same type of challenge value sent at step 215 again may be randomly selected and sent by the secure processor 155 at step 290. In some aspects, the challenge value in the validation message sent at step 290 may be associated with a private key stored on the mobile device 123. In other embodiments, the challenge value may be a question having a unique answer that should ideally be known only to the user 143.

Accordingly, at step 297, the secure processor 155 may receive the validation message from step 295, and determine whether the validation message response confirms the validity of the mobile device 123 and the user 143. Responsive to determining that the validation message is proper, the secure processor 155 may allow the vehicle operation, and the process of FIG. 2 ends.

Figure 3:
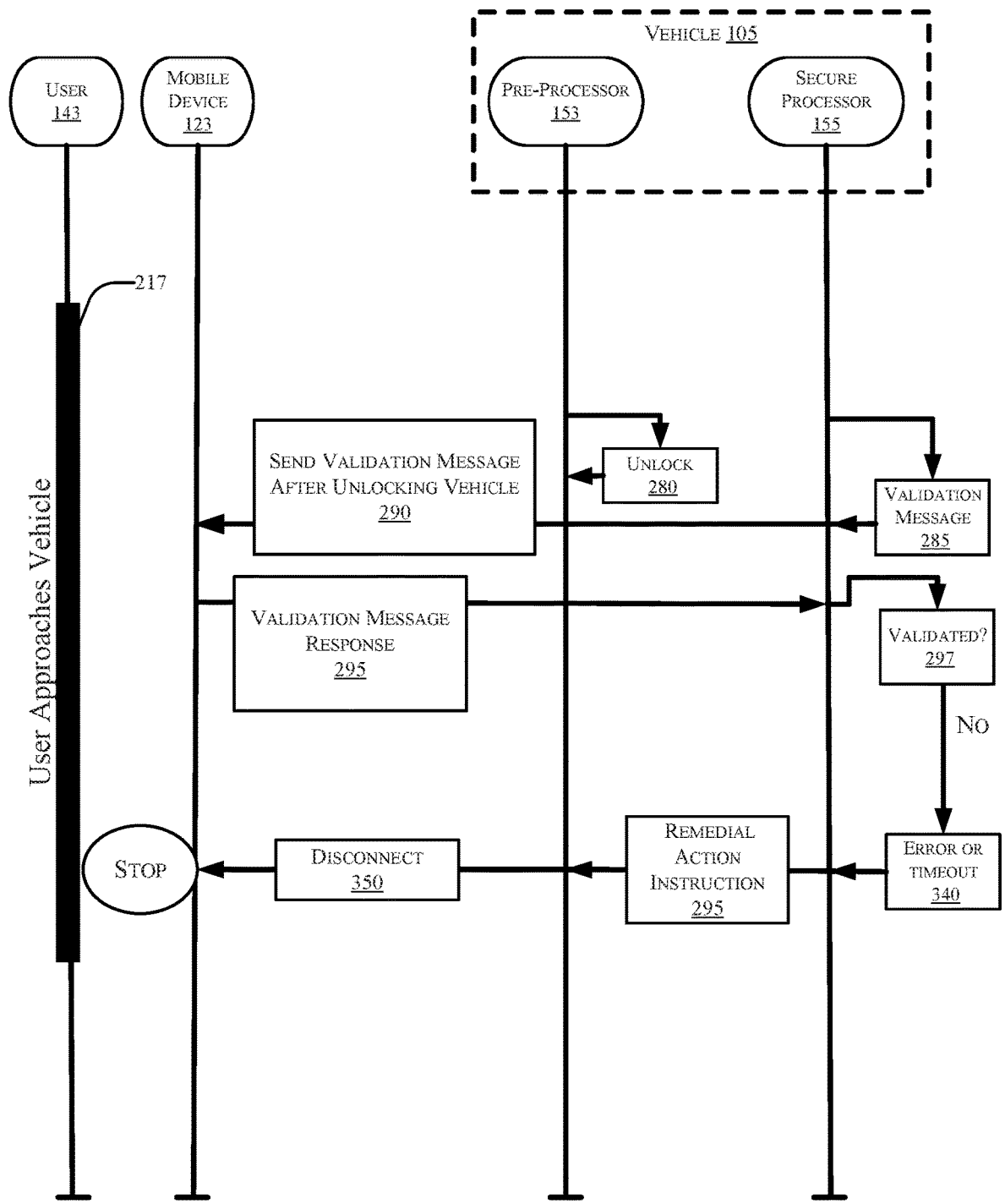
FIG. 3 illustrates another example embodiment of the present disclosure where the automotive computer of FIG. 2 uses the secure processor to determine authenticity after providing access according to embodiments described herein, and performs remedial actions in response to a failed validation.

FIG. 3 depicts another example embodiment of the present disclosure, where the automotive computer 148 uses the secure processor 155 to determine authenticity of the mobile device 123 and the user 143 after providing access to the vehicle 105 after the unlock step 280 of FIG. 2. The secure processor 155 may generate one or more remedial action instructions responsive to determining that the mobile device 123 and/or the user 143 is not validated at step 297. For example, the secure processor 155 may determine that the mobile device 123 is not authorized for access to the vehicle 105, either by the mobile device 123 returning an invalid validation response message, or by failing to return a response at all (and thus, creating a timeout error). The secure processor 155 may then generate one or more instructions that cause a remedial action, such as logging the event with a Diagnostic Trouble Code (DTC), offboarding the DTC for further analysis on a server, sounding an alarm (e.g., the anti-theft alarm, the horn, etc.), flashing headlamps, disabling one or more operational functions, transmitting a message to one or more remote servers (e.g., the remote server(s) 161), transmitting a message to the vehicle owner, disable shifting vehicle out of park, limiting vehicle drive speed, generating an automated message to authorities such as, for example, local police, and/or performing other actions not listed herein.

Figure 4:
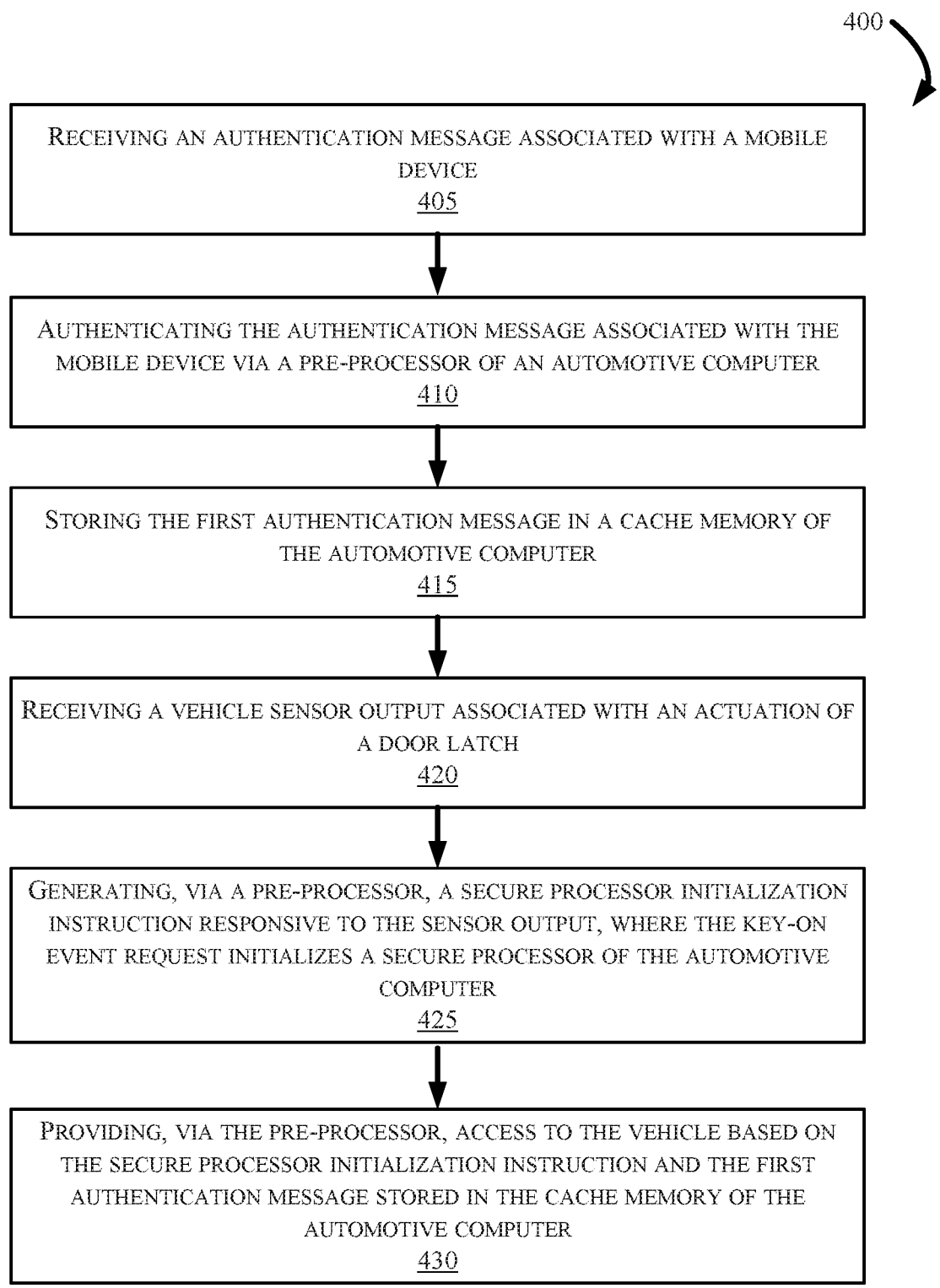
FIG. 4 illustrates a block diagram of an exemplary computer system for use in practicing the embodiments described herein.

FIG. 4 depicts an example method 400 for providing two-step authentication of a mobile device used as part of a PaaK system, such as the PaaK system 107 as shown in FIG. 1.

At step 405, a pre-processor (e.g., the pre-processor 153 as shown in FIG. 1) may receive an authentication message associated with a mobile device.

At step 410, the secure processor 155 may validate an authentication message received from the mobile device 123 at a pre-processor (e.g., the pre-processor 153) of an automotive computer. An example automotive computer may be substantially similar or identical to the automotive computer 148 depicted in FIG. 1.

As shown in step 415, the method includes storing the authentication message response in a cache memory of the automotive computer. The cache memory may be disposed as part of the secure processor 155, the pre-processor 153, and/or be included with the memory 157.

At step 420, the method can include receiving the vehicle sensor output associated with actuation of a door latch 160 of the vehicle. For example, a vehicle sensor configured with the door latch, and/or the door handle 160 may sense a user touch as the user attempts to open the door. The touch may cause the sensor to generate a sensor output, which may be received by the pre-processor 153 as described in embodiments above.

At step 425, the pre-processor 153 may generate a secure processor 155 initialization instruction that initializes the secure processor of the automotive computer.

At step 430, the pre-processor 153 may provide access to the vehicle based on the secure processor 155 initialization instruction and the authentication message stored in the cache memory of the automotive computer.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method for authenticating a mobile device as a key to a vehicle, the method comprising:
   sending a message to a mobile device configured to trigger sending of a pre-authentication message upon detection that the mobile device has reached a pre-determined distance from the vehicle;
   receiving a pre-authentication message from the mobile device sent at a pre-determined interval;
   authenticating the pre-authentication message via a pre-processor of an automotive computer;
   storing the pre-authentication message in a cache memory of the automotive computer;
   receiving a vehicle sensor output associated with detection of a physical touch on vehicle surface;
   generating, via the pre-processor, a secure processor initialization instruction responsive to the vehicle sensor output associated with the detection of the physical touch on the vehicle surface, wherein the secure processor initialization instruction initializes a secure processor of the automotive computer; and
   providing, via the pre-processor, access to the vehicle based on the secure processor initialization instruction, and the pre-authentication message stored in the cache memory of the automotive computer;
   validating the mobile device with a second authentication, the validating comprising:
      transmitting, via the secure processor disposed in communication with a wireless transceiver, a validation message associated with a private key associated with the mobile device;
      determining a remedial action based on a validation message response; and
      determining a series of escalating remedial actions based on a plurality of validation message responses, comprising:
         determining a remedial action based on a validation message response and a geo-location of the vehicle or mobile device;

determining a remedial action based on a plurality of validation message responses in a given geo-location of the vehicle or mobile device;

determining a remedial action based on a validation message response and a date and time; and determining a remedial action based on a plurality of validation message responses in a given date or time of day;

generating an instruction for performing the remedial action; and performing the remedial action based on the instruction.

2. The computer-implemented method according to claim 1, wherein receiving the vehicle sensor output comprises:

receiving a user touch to a vehicle surface detected by way of a capacitive sensor or electromagnetic sensor;

receiving a signal indicative of an actuation of a door latch; or receiving a video feed by way of a video camera associated with the vehicle.

3. The computer-implemented method according to claim 1, wherein determining the remedial action comprises:

receiving the validation message, via the secure processor, and comparing the validation message, via the secure processor, to a public key associated with the private key; and selecting the remedial action from a plurality of remedial actions associated with a vehicle operation or a vehicle alarm or other vehicle feature, the selecting responsive to geo-location of the vehicle or mobile device, date and time of day, and determining that the validation message response does not match a predetermined authorized response associated with the private key and the public key.

4. The computer-implemented method according to claim 1, wherein determining the remedial action comprises:

determining that the validation message response is not received within a predetermined time interval from receiving the vehicle sensor output; and selecting the remedial action of a plurality of remedial actions associated with a vehicle operation or a vehicle alarm or other vehicle feature responsive to geo-location of the vehicle or mobile device, date and time of day, and determining that the validation message response is not received within the predetermined time interval from receiving the vehicle sensor output.

5. The computer-implemented method according to claim 3, wherein determining the remedial action comprises:

determining that the validation message response is received within a predetermined time interval from receiving the vehicle sensor output;

determining that the validation message response is valid; and allowing vehicle operation based on determining that the validation message response is valid.

6. The computer-implemented method according to claim 1, wherein determining the remedial action comprises:

determining that a summation of invalid validation message responses exceeds a first threshold;

determining that the summation of invalid validation message responses exceeds a second threshold for a given geo-location of the vehicle or mobile device;

determining that the summation of invalid validation message responses exceeds a third threshold for a given date or time of day; and selecting a remedial action of a plurality of remedial actions associated with a vehicle operation or a vehicle alarm based on the first threshold, the second threshold and the third threshold.

7. The computer-implemented method of claim 1, further comprising:

determining a remedial action instruction based on a response to the validation message; and transmitting, to a vehicle Telematics Control Unit (TCU), the remedial action instruction responsive to determining that the validation message response is invalid or a timeout error occurs;

wherein the remedial action instruction is configured to cause the TCU to sound an alarm or disable a vehicle function.

8. The computer-implemented method according to claim 1, further comprising, after authenticating the pre-authentication message associated with the mobile device via the pre-processor of the automotive computer, sending a power mode instruction to the secure processor, the power mode instruction configured to cause a vehicle Telematics Control Unit (TCU) to change a TCU state from a low energy state to a higher energy state.

9. A Phone as a Key (PaaK) system for a vehicle, comprising:

a pre-processor;

a secure processor disposed in communication with the pre-processor;

a cache memory associated with the pre-processor and the secure processor; and a memory for storing executable instructions, wherein the pre-processor and the secured processor are configured to execute the instructions to:

determine a geo-location of the vehicle and mobile device determine a current date and time;

send a message to a mobile device, the message configured to trigger sending of a pre-authentication message upon detection that the mobile device has reached a pre-determined distance from the vehicle;

authenticate the pre-authentication message associated with the mobile device;

send a power mode instruction to the secure processor, wherein the power mode instruction is configured to cause a vehicle Telematics Control Unit (TCU) to change a TCU state from a low energy state to a higher energy state;

receive an authentication message, at a pre-determined interval, from a mobile device used as a key for the vehicle;

authenticate the authentication message via the pre-processor;

save the authentication message in the cache memory;

receive a vehicle sensor output associated with user proximity to the vehicle;

generate, via the pre-processor, a secure processor initialization instruction responsive to the vehicle sensor output associated with a user proximity, wherein the secure processor initialization instruction initializes the secure processor of an automotive computer; and provide, via the pre-processor, access to the vehicle based on the secure processor initialization instruction of the authentication message stored in the cache memory.

10. The system according to claim 9, wherein receiving the vehicle sensor output associated with the user proximity to the vehicle comprises:
 receiving a user touch to a vehicle surface detected by way of a capacitive sensor or electromagnetic sensor;
 receiving an actuation of a door latch; or
 receiving a video feed by way of a video camera associated with the vehicle.

11. The system according to claim 9, wherein the secure processor is further configured to:
 transmit, to the mobile device, via a wireless transceiver associated with the secure processor, a validation message having a private key associated with the mobile device;
 receive, via the wireless transceiver, a validation message response based on the validation message having the private key associated with the mobile device;
 determine a remedial action based on the validation message response, geo-location of the vehicle or mobile device, and date and time of day; and
 generate an instruction for performing the remedial action based on the validation message response.

12. The system according to claim 9, wherein the secure processor is further configured to:
 receive a validation message, via the secure processor, and compare the validation message to a public key associated with a private key;
 determine a geo-location of the vehicle or mobile device;
 determine that a validation response does not match a predetermined authorized response based on the private key and the public key, and based on the geo-location of the vehicle or the mobile device; and
 select a remedial action that limits a vehicle operation or triggers an alarm.

13. The system according to claim 9, wherein the secure processor is further configured to:
 determine, via the secure processor, that a validation message response is not received within a predetermined time interval from receiving the vehicle sensor output; and
 select a remedial action of a plurality of remedial actions associated with a vehicle operation or a vehicle alarm responsive to geo-location of the vehicle or mobile device, date and time of day, and determining that the validation message response is not received within the predetermined time interval from receiving the vehicle sensor output.

14. The system according to claim 9, wherein the secure processor is further configured to:
 determine that a validation message response is received within a predetermined time interval from receiving the vehicle sensor output;
 determine that the validation message response is valid; and
 allowing vehicle operation based on determining that the validation message response is valid.

15. The system according to claim 9, wherein the secure processor is configured to:
 determine a summation of validation message responses that do not match a predetermined authorized response associated with a private key or a public key, and validation message responses not received within a predetermined time interval from receiving the vehicle sensor output;
 determine that the summation of invalid validation message responses exceeds a first threshold;
 determine that the summation of invalid validation message responses exceeds a second threshold for a given geo-location of the vehicle or mobile device;
 determine that the summation of invalid validation message responses exceeds a third threshold for a given date or time of day; and
 select a remedial action of a plurality of remedial actions associated with a vehicle operation or a vehicle alarm based on the first threshold, the second threshold and the third threshold.

16. The system according to claim 9, wherein the secure processor is configured to:
 determining a remedial action instruction based on a response to a validation message; and
 transmit, to a vehicle Telematics Control Unit (TCU), the remedial action instruction responsive to determining that a validation message response is invalid or a timeout error occurs;
 wherein the remedial action instruction is configured to cause the TCU to sound an alarm or disable a vehicle function.

17. A non-transitory computer-readable storage medium comprising instructions that, when executed by one or more processors, cause the processors to perform acts for authenticating a mobile device as a key to a vehicle, the acts comprising:
 determining or receiving a geo-location of the vehicle and mobile device
 determining or receiving a current date and time
 sending a message to a mobile device, the message configured to trigger sending of a pre-authentication message upon detection that the mobile device has reached a pre-determined distance from the vehicle;
 receiving, an authentication message from the mobile device;
 validating the authentication message via a pre-processor of an automotive computer;
 storing the authentication message in a cache memory of the automotive computer;
 receiving a vehicle sensor output associated with an actuation of a door latch, detection of physical touch on vehicle surface through capacitive sensing, or presence detection through cameras or other electromagnetic sensing;
 generating, via the pre-processor, a secure processor initialization instruction responsive to the vehicle sensor output associated with the actuation of the door latch, detection of physical touch on vehicle surface through capacitive sensing, or presence detection through cameras or other electromagnetic sensing, wherein the secure processor initialization instruction initializes a secure processor of the automotive computer;
 providing, via the pre-processor, access to the vehicle based on the secure processor initialization instruction and the authentication message stored in the cache memory of the automotive computer;
 transmitting, to the mobile device, via a wireless transceiver disposed in communication with the secure processor, a validation message having a private key associated with the mobile device;
 receiving, via the wireless transceiver, a validation message response based on the validation message having the private key associated with the mobile device;
 determining a remedial action based on the validation message response;
 determining a series of escalating remedial actions based on a plurality of validation message responses;

determining a remedial action based on a validation message response and a geo-location of the vehicle or mobile device;
determining a remedial action based on a plurality of validation message responses in a given geo-location of the vehicle or mobile device;
determining a remedial action based on a validation message response and a date and time;
determining a remedial action based on a plurality of validation message responses in a given date or time of day;
generating an instruction for performing the remedial action; and
performing the remedial action based on the instruction.

* * * * *